(12) United States Patent
Chmelík et al.

(10) Patent No.: US 8,526,003 B2
(45) Date of Patent: Sep. 3, 2013

(54) INTERFEROMETRIC SYSTEM WITH SPATIAL CARRIER FREQUENCY CAPABLE OF IMAGING IN POLYCHROMATIC RADIATION

(75) Inventors: Radim Chmelík, Brno (CZ); Pavel Kolman, Dačice (CZ); Tomáš Slabý, Písek (CZ); Martin Antoš, Hrušovany u Brna (CZ); Zbyněk Dostál, Žamberk (CZ)

(73) Assignee: Vysoke Uceni Technicke Brne, Brno (CZ)

( * ) Notice: Subject to any disclaimer, the term of this patent is extended or adjusted under 35 U.S.C. 154(b) by 233 days.

(21) Appl. No.: 13/083,947

(22) Filed: Apr. 11, 2011

(65) Prior Publication Data

US 2011/0255093 A1    Oct. 20, 2011

(30) Foreign Application Priority Data

Apr. 14, 2010    (CZ) ................ PV 2010-288

(51) Int. Cl.
*G01D 5/38* (2006.01)
*G01B 9/02* (2006.01)

(52) U.S. Cl.
USPC ................ 356/457; 356/494; 356/521

(58) Field of Classification Search
USPC ............. 356/457, 458, 497, 499, 521, 512, 356/450, 494, 485–487, 490; 359/11, 27, 359/32; 250/231.13, 365, 361 R
See application file for complete search history.

(56) References Cited

U.S. PATENT DOCUMENTS

| | | | |
|---|---|---|---|
| 3,580,655 A | | 5/1971 | Leith |
| 4,786,124 A | * | 11/1988 | Stone et al. ............ 359/15 |
| 5,068,751 A | * | 11/1991 | Braat et al. ............ 359/566 |

(Continued)

FOREIGN PATENT DOCUMENTS

| CZ | 8547 | 6/1999 |
|---|---|---|
| CZ | 19150 | 12/2008 |

OTHER PUBLICATIONS

Czech Republic Search Report for CZ PV2010-288 dated May 24, 2010.

*Primary Examiner* — Tarifur Chowdhury
*Assistant Examiner* — Maurice Smith
(74) *Attorney, Agent, or Firm* — Buchanan Ingersoll & Rooney PC (57) ABSTRACT

In the interferometric system, the image plane is imaged by an output imaging setup via a transmission system of reflectors to the output plane and a reflection type diffraction grating is located in the image plane of an imaging setup of a reference branch. The transmission systems of reflectors are adjusted so that axes of both branches coincide at an entrance to the output plane and parallel with a normal line of the output plane, and an axial beam, diffracted by the reflection type diffraction grating at an angle $\alpha$, enters into the output plane at an angle $\beta$, and the relation between angle $\beta$ and $\alpha$ is $\sin(\beta)=\sin(\alpha)/m$, where m is a magnification of the output imaging setup. The system enables the achievement of a holographic imaging of an object by low-coherence waves. Incoherent waves allow the imaging of objects immersed in scattering media.

18 Claims, 3 Drawing Sheets

(56) References Cited

U.S. PATENT DOCUMENTS

| | | | |
|---|---|---|---|
| 7,034,271 B1 | 4/2006 | Sinclair et al. | |
| 7,535,647 B1 * | 5/2009 | Otten et al. | 359/634 |
| 7,859,679 B2 * | 12/2010 | Bouma et al. | 356/479 |
| 2009/0219541 A1 * | 9/2009 | Farah | 356/450 |

* cited by examiner

INTERFEROMETRIC SYSTEM WITH SPATIAL CARRIER FREQUENCY CAPABLE OF IMAGING IN POLYCHROMATIC RADIATION

BACKGROUND OF THE INVENTION

The presented solution describes an interferometric system with spatial carrier frequency creating a holographic image by means of low-coherence waves, allowing to achieve confocal imaging in broadband waves emitted by an extended, spatially incoherent source, and in real time.

DESCRIPTION OF PRIOR ART

A common feature of current interferometric systems with separated object and reference branches is a light beam splitter which splits the beam of waves into two mutually coherent beams which enter into the object and the reference branch. Current systems may be divided into three basic groups.

The first group includes interferometric systems, which in most cases use traditional Mach-Zehnder or Michelson interferometers where axes of both branches at the output from the interferometer coincide and the waves therefore interfere at a zero angle. This system allows to use a completely incoherent source of waves, such as a regular light bulb; the advantage here is the elimination of coherence noise and a stronger depth discrimination of the resulting image, i.e. optical cross-sections through a sample. The disadvantage is that in order to obtain complete information about the object wave, a minimum of 3 images with different phase shifts must be captured, which introduces undesirable consequences. Firstly, fluctuations of the ambient environment and vibrations increase the noise in the resulting image and, secondly, it does not allow the observation of rapidly varying phenomena. This system is used in microscopes Krug & Lau, Horn and Mirau objective lens.

The second group includes holographic systems. These systems use the same interferometers as the first group; the difference here is that axes of both branches at the output of the interferometer intersect at such a sufficiently large non-zero angle that the created interference structure has sufficiently high spatial frequency, which allows the reconstruction of the object wave from a single interferogram, i.e. hologram, which is achieved by a simple tilt of a mirror or other element with a similar function. Such interferometer is not achromatic and therefore broadband waves cannot be used because waves with different wavelengths enter into the output plane at the same angle and the interference structure has different spatial frequencies for each individual wavelength. In the sum, the desired interference structure (fringes) is missing in a large portion of the field of view. The advantage of this configuration is that the image can be completely reconstructed from a single record, of a hologram. Another positive aspect is that the sampling rate depends only on the detector, not on the holographic system setup. This system is suitable for monitoring dynamic processes. The disadvantage is the need to use coherent or partially spatially incoherent waves, such as laser, so that the interference occurs in the whole field of view, which introduces the following negative consequences: the presence of coherence noise and a considerably limited capability to observe samples immersed in a scattering media. The field of view is two times smaller compared to the systems in the first group, which is implied by the holographic condition.

The third group includes coherence-controlled achromatic holographic systems. This group removes the handicap described in the second group by the fact that the waves with different wavelengths enter the output plane of the interferometer at such different angles that the created interference structure has for each wavelength equal and sufficiently high spatial frequency (density of fringes), which allows the reconstruction of the object wave in the whole field of view from a single interferogram, i.e. hologram. It is achieved by a light beam splitter, here in a form of a diffraction grating. The $+1^{st}$ diffraction order enters into the object branch and the $-1^{st}$ diffraction order enters into the reference branch. As a result of angular dispersion of the waves on the diffraction grating the different wavelengths come out from it at different angles and in this form they enter into the condensers. The diffraction grating in each branch is imaged by relevant imaging setup into the output plane of the interferometer, thus ensuring that angular dispersion of waves in both branches is kept and this condition meets the presumption that achromatic interference fringes can be created. This solution includes all advantages listed for the above-mentioned first and second groups and simultaneously it eliminates the disadvantages mentioned for each of them. However, the disadvantage here is the fact that the condenser lens and the objective lens forming the imaging setup in each branch must be two identical elements, i.e. if for instance a transmitted-light microscope is used, four identical lenses for each magnification level must be used. The consequences include financial demands, limited space between the objective lens and the condenser lens for lenses with higher magnification. The field of view is the same as for the systems in the second group. This solution is also used in utility designs CZ 8547 and CZ 19150.

SUMMARY OF THE INVENTION

The disadvantages mentioned above are eliminated by an interferometric system with spatial carrier frequency capable of imaging in broadband waves according to the presented invention. The system consists of an extended, temporally and spatially incoherent source of waves, after which a wave splitter is inserted and used to split the incoming waves into two separate branches of the interferometer, specifically into the first branch and the second branch. On the axis of the first branch, there is an arbitrarily designed first imaging setup located and on the axis of the second branch the second imaging setup is located, which must be identical with the first imaging setup with respect to both the times of propagation of waves and the magnification. It may be different, for example, due the fact that the first imaging setup may image in transmitted-waves and the second one in reflected-waves.

The interferometric system further contains a detector located in the output plane. The condition is that the difference of time of propagation of the waves in the first and the second branch shall not be greater than the coherence time of the used waves. The first, or second branch respectively, starts at the point where the incoming waves are split, and the end of the first, or second branch respectively, is at the output plane of the interferometer.

The image plane of the first imaging setup of the first branch is with respect to the first imaging setup an image of the object plane of this imaging setup and simultaneously the image plane of the second imaging setup of the second branch is with respect to the second imaging setup an image of the object plane of this imaging setup.

The principle of the new solution is that after the image plane of the first imaging setup of the first branch and before the output plane of the interferometer, the first output imaging setup is located on the axis of the first branch and simultaneously after the image plane of the second imaging setup of the second branch and before the output plane of the interferometer, the second output imaging setup is located on the axis of the second branch.

The output plane of the interferometer with respect to the first output imaging setup is an image of the image plane of the first imaging setup of the first branch and simultaneously the output plane of the interferometer with respect to the second output imaging setup is an image of the image plane of the second imaging setup of the second branch.

The total magnification between the object plane of the first imaging setup of the first branch and the output plane of the interferometer is equal to the total magnification between the object plane of the second imaging setup of the second branch and the output plane of the interferometer.

At least in one branch, between the relevant imaging setup of the given branch and the output plane of the interferometer, there is the first transmission system of reflectors located in the first branch and the second transmission system of reflectors in the second branch such that the axis of the first branch and the axis of the second branch coincide before the entrance to the output plane of the interferometer and they are parallel with the normal line of the output plane of the interferometer.

The beam travelling on the axis of the first branch enters into the first output imaging setup on its axis and exits from it also on its axis and enters into the output plane of the interferometer in the direction of its normal line.

Adjacent to the image plane of the second imaging setup of the second branch, there is a diffraction grating located. The beam travelling on the axis of the second branch and diffracted by the diffraction grating at an angle $\alpha$ enters into the second output imaging setup also at the angle $\alpha$ with respect to the axis of this output imaging setup and exits from this imaging setup with respect to its axis at an angle $\beta$ and enters into the output plane of the interferometer with respect to its normal line also at the angle $\beta$. The relation between angles $\beta$ and $\alpha$ is $\sin(\beta)=\sin(\alpha)/m2$ where m2 is a magnification of the second output imaging setup.

The analogical solution is based on the fact that adjacent to the image plane of the first imaging setup of the first branch there is the first diffraction grating located and adjacent to the image plane of the second imaging setup of the second branch there is the second diffraction grating located.

The beams travelling on their respective axes of the first and of the second branch and diffracted by the first and the second diffraction grating at an angle $\alpha 1$ and $\alpha 2$, respectively, enter into the first and the second output imaging setup also at the angle $\alpha 1$ and $\alpha 2$ with respect to the axis of the first and of the second output imaging setup, respectively, and exit from their respective output imaging setup with respect to its axis at an angle $\beta 1$ and $\beta 2$, respectively. The relation between angles $\beta 1$, $\alpha 1$ and $\beta 2$, $\alpha 2$ is $\sin(\beta 1)=\sin(\alpha 1)/m1$ where m1 is a magnification of the first output imaging setup, and $\sin(\beta 2)=\sin(\alpha 2)/m2$ where m2 is a magnification of the second output imaging setup, respectively.

When waves from the visible range of the electromagnetic radiation are used, all imaging setups, it means the first and second imaging setups and the first output and the second output imaging setups, may be formed by arbitrary setups of lenses, mirrors and other optical elements, and all transmission systems of reflectors (i.e. the first and second transmission systems of reflectors) may be formed, for example, by arbitrary setups of mirrors and other reflective optical elements, the above-mentioned conditions for individual imaging and transmission systems must be observed with all of these. When other types of waves are used, it shall apply that all the above-mentioned conditions must be observed by all elements having analogical functions to the elements mentioned in the example for waves from the visible range of the electromagnetic radiation.

In one possible embodiment, for both the cases mentioned above, after the first imaging setup of the first branch and on its axis, there may be the first scanning unit located and after the second imaging setup of the second branch and on its axis, there may be the second scanning unit located, which enables to shift the image in the output image plane.

In one possible embodiment, for both the cases mentioned above, the first output imaging setup and the second output imaging setup may be formed by a common output imaging setup located on the common axis of the first and second branches between the image planes of the imaging setups and the output plane of the interferometer.

In one specific embodiment, the first branch is an object branch, the second branch is a reference branch, the first output imaging setup and the second output imaging setup are formed by a common output imaging setup and the diffraction grating is a reflection type diffraction grating located adjacent to the image plane of the second imaging setup of the reference branch. The second transmission system of reflectors belonging to the reflection type diffraction grating is formed at its input by an adjustable semi-transparent flat mirror located on the axis of the second transmission system of reflectors and also on the axis of the second imaging setup and in the path of diffracted waves coming from the diffraction grating. Further, it is formed by an adjustable fifth flat mirror located in the path of waves reflected by the semi-transparent flat mirror. The reflective surface of the semi-transparent flat mirror forms a right angle with the reflective surface of the fifth flat mirror. The first transmission system of reflectors is then formed at its input by the first flat mirror located on the axis of the first transmission system of reflectors and also on the axis of the first imaging setup, and by the second flat mirror located in the path of waves reflected by the first flat mirror in such a way that its reflective surface is perpendicular to the reflective surface of the first flat mirror and parallel with the reflective surface of the third flat mirror located after it, which has the reflective surface perpendicular to the reflective surface of the fourth flat mirror located in the path of a reflected beam.

In other specific embodiment, the first branch is an object branch, the second branch is a reference branch. The first diffraction grating is a transmission type diffraction grating located adjacent to the plane of the first imaging setup of the object branch and the second diffraction grating is a transmission type diffraction grating located adjacent to the object plane of the second imaging setup of the reference branch. The second transmission system of reflectors belonging to the second diffraction grating is formed at its input by an adjustable sixth flat mirror located on the axis of the second transmission system of reflectors and also on the axis of the second imaging setup and in the path of diffracted waves coming from the second diffraction grating. Further, it is formed by an adjustable fifth flat mirror located in the path of waves reflected by the sixth flat mirror. The reflective surface of the fifth flat mirror is parallel with the reflective surface of the sixth flat mirror. The first transmission system of reflectors belonging to the first diffraction grating is then formed at its input by the first flat mirror located on the axis of the first transmission system of reflectors and also on the axis of the first imaging setup and in the path of diffracted waves coming from the first diffraction grating. Further it is formed by the second flat mirror located in the path of waves reflected by the first flat mirror in such a way that its reflective surface is perpendicular to the reflective surface of the first flat mirror and parallel with the reflective surface of the third flat mirror located after it, which has the reflective surface perpendicular to the reflective surface of the fourth flat mirror located in the path of reflected beam.

In an embodiment, where the first and second diffraction gratings are implemented, all alternatives are possible, it means that both these diffraction gratings are formed by reflection type diffraction grating or by transmission type diffraction grating, or one is a reflection type and the other is a transmission type diffraction grating.

Another option is that the diffraction gratings are located in their relevant image planes of the imaging setups or in surroundings limited by a distance of ±500 mm from their relevant image planes.

The advantage of this solution is that the system enables holographic imaging of an object by low-coherence waves, such as white light of an extended light source. Incoherent waves allow to image objects immersed in scattering media. The imaging is performed in real time. A single, digitally recorded hologram of a part of an observed sample can be used for numerical reconstruction of the object wave, it means its intensity and phase. The intensity image is depth discriminated, i.e. it images only the part of a sample located in a vicinity of the object plane of the imaging setup, in fact a cross-section through the observed sample. Cross-section thickness depends on the degree of coherence of the used waves and, if light microscopy is considered, it can be narrower than an optical cross-section obtained by confocal microscope. The phase image corresponds to the difference of times of propagation through the object and the reference branches caused by the observed sample, it is quantitative and it may be used for measuring the depth of reflective samples with accuracy in orders of thousandths of a wavelength, or, for example, in case of transmitted-light microscopic imaging, it can be used to weigh cells or to analyze an intracellular mass movement.

Therefore one can state that features common at least for some of the systems belonging to some of the above-mentioned groups include the following. An extended, temporally and spatially incoherent source of waves, which, for example, in optical microscopy includes a regular light bulb, collector lens, ground-glass, aperture diaphragm variable in size (iris diaphragm or a set of removable diaphragms of various diameters), replaceable band-pass filters, replaceable neutral density filters to regulate light intensity and IR cut-off filter, which blocks the long-wave light. Other common features include a wave splitter which splits the incoming waves into the object and reference branches, plus imaging setups in such branches, output imaging setups belonging to each branch or common output imaging setup and detector.

The presented solution features all the advantages mentioned for the third group described in prior art, i.e. for coherence-controlled achromatic holographic systems, while simultaneously it eliminates all the disadvantages mentioned for them. The field of view remains the same as for the systems from the second group.

OVERVIEW OF FIGURES IN DRAWINGS

Some of the possible embodiments are shown in the attached drawings.

DETAILED DESCRIPTION OF THE PREFERRED EMBODIMENTS

Figure 1:
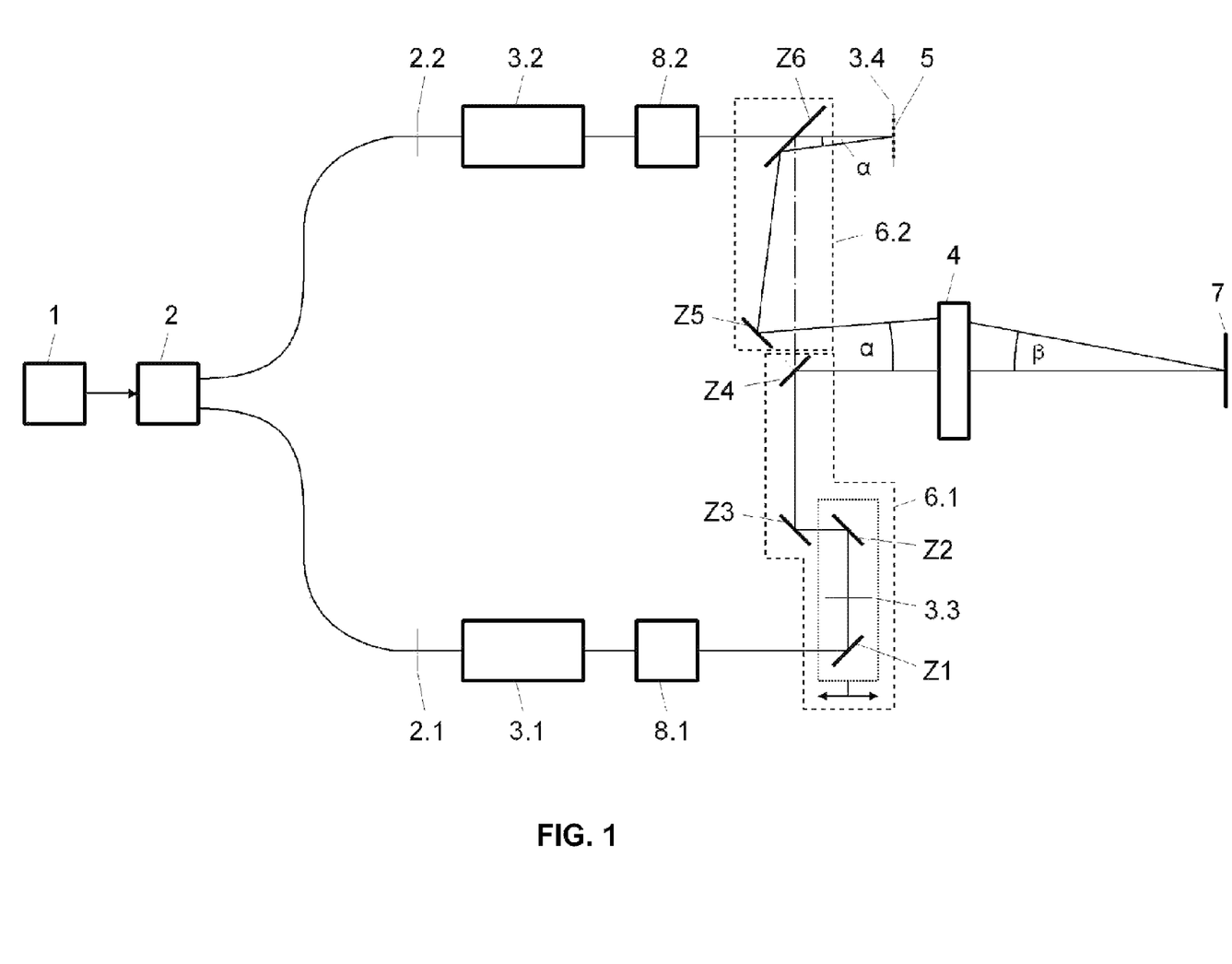
FIG. 1 shows a diagram of an interferometric system with reflection type diffraction grating located in the reference branch and with a single, common output imaging setup.

One preferred embodiment of the interferometric system according to the invention is shown in FIG. 1. It is an interferometric system with spatial carrier frequency creating a holographic image by means of low-coherence light allowing a confocal imaging in white light of spatially incoherent extended source and in real time. The first transmission system 6.1 and the second transmission system 6.2 of reflectors are in this case realized by the setups of mirrors. This interferometric system is formed at its input by an extended, temporally and spatially incoherent light source 1, after which is located an optical beam splitter 2, which here is a standard element, such as a splitting cube. The optical beam splitter 2 splits the incoming light into the object branch and the reference branch. The first imaging setup 3.1 designed arbitrarily, is located in the object branch. The second imaging setup 3.2, optically identical with the first imaging setup 3.1 in the given example, is located in the reference branch. The interferometric system further contains the output imaging setup 4 in its output part. In the output plane 7 of the interferometer, there is a detector located. The condition here is that the optical path difference between both branches, measured from the point of light-beam splitting in the light-beam splitter 2 up to the output plane 7 of the interferometer, is smaller than the coherence length of the used light. In the given example, a diffraction grating 5 is located adjacent to the image plane 3.4 of the second imaging setup 3.2 of the reference branch. Between the diffraction plane of the diffraction grating 5 and the output imaging setup 4, there is the second transmission system 6.2 of reflectors inserted, which can be realized in many ways. The significant point is that it is adjusted in such a way that the light beam travelling on the axis of the reference branch and diffracted by the diffraction grating 5 at an angle $\alpha$ enters into the output imaging setup 4 also at the angle $\alpha$ with respect to the optical axis of this output imaging setup 4 and exits from the output imaging setup 4 with respect to its optical axis at an angle $\beta$ and then enters into the output plane 7 of the interferometer with respect to its normal line also at the angle $\beta$. The relation between angles $\beta$ and $\alpha$ is $\sin(\beta)=\sin(\alpha)/m$ where m is a magnification of the output imaging setup 4.

In the given example, in the object branch at the output of the first imaging setup 3.1, there is the first transmission system 6.1 of reflectors inserted, which again can be designed in many ways, however it must be adjusted in such a way that the light beam traveling on the axis of the first imaging setup 3.1 is led via the first transmission system 6.1 of reflectors and via the output imaging setup 4 to the output plane 7 of the interferometer in the direction of its normal line. Image plane 3.3 of the first imaging setup 3.1 of the object branch and the output plane 7 of the interferometer and also the image plane 3.4 of the second imaging setup 3.2 of the reference branch and the output plane 7 of the interferometer must be optically conjugated with respect to the output imaging setup 4.

Figure 3:
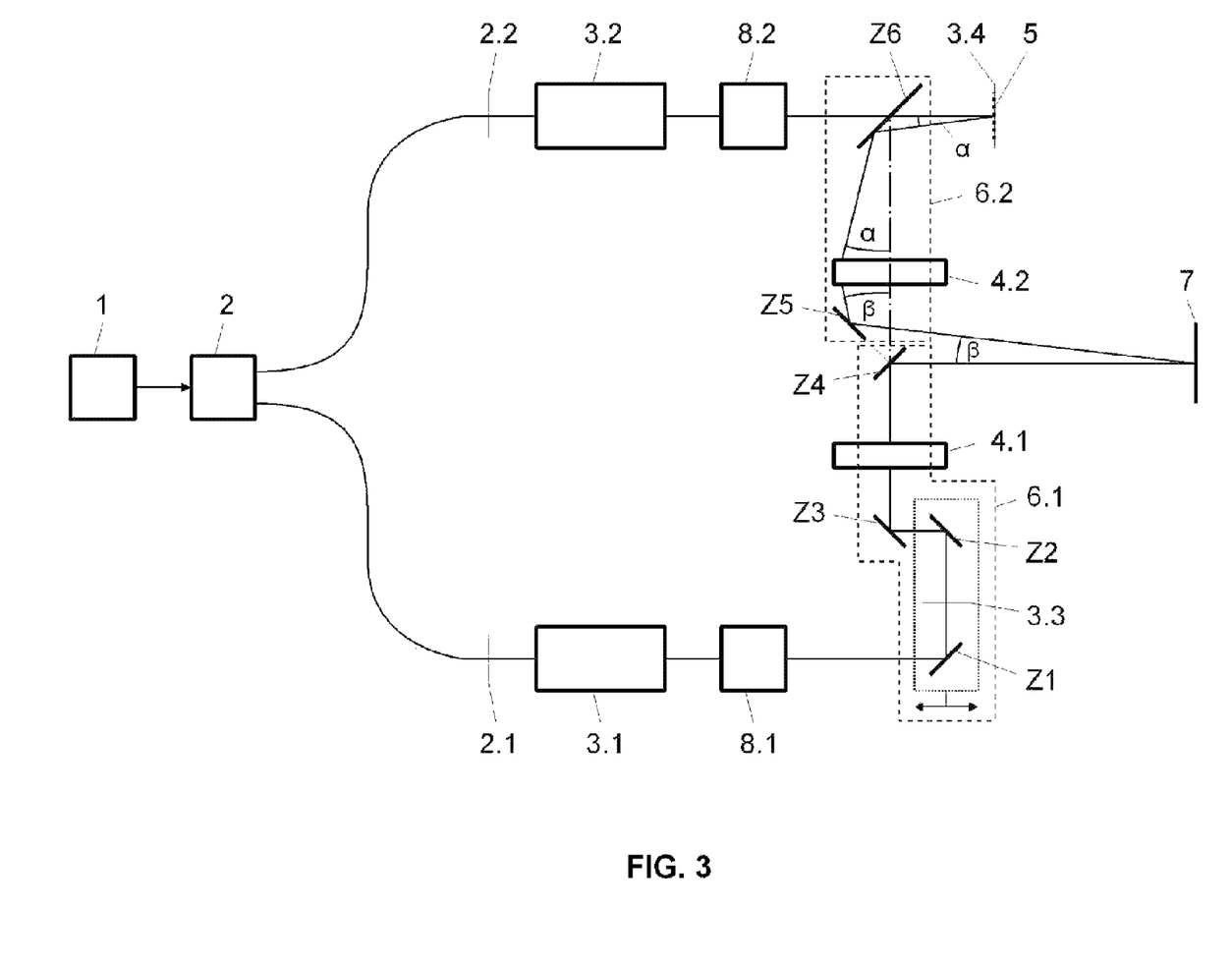
FIG. 3 shows an interferometric system with two mutually separated output imaging setups.

The interferometric system according to the given example may contain two mutually separated output imaging setups 4.1 and 4.2 as shown in FIG. 3 instead of one output imaging setup 4. In order to maintain a clear and simple orientation, other elements are arranged identically as in the preceding example, however they can also be arranged otherwise.

Output plane 7 of the interferometer is with respect to the first output imaging setup 4.1 an image of the image plane 3.3 of the first imaging setup 3.1 of the object branch and with respect to the second output imaging setup 4.2 it is an image of the image plane 3.4 of the second imaging setup 3.2 of the reference branch.

The beam of waves travelling on the axis of the first imaging setup 3.1 of the object branch enters into the first output imaging setup 4.1 on its axis and exits from it also on its axis and enters into the output plane 7 of the interferometer in the direction of its normal line.

Adjacent to the image plane 3.4 of the second imaging setup 3.2 of the reference branch, there is a diffraction grating 5 located and the beam of waves travelling on the axis of the second imaging setup 3.2 of the reference branch and diffracted by the diffraction grating 5 at an angle $\alpha$ enters into the second output imaging setup 4.2 also at the angle $\alpha$ with respect to the axis of this second output imaging setup 4.2 and exits from this second output imaging setup 4.2 with respect to its axis at an angle $\beta$ and enters into the output plane 7 of the interferometer with respect to its normal line also at the angle $\beta$, while the relation between angles $\beta$ and $\alpha$ is $\sin(\beta)=\sin(\alpha)/m$ where m is a magnification of the second output imaging setup 4.2.

Figure 2:
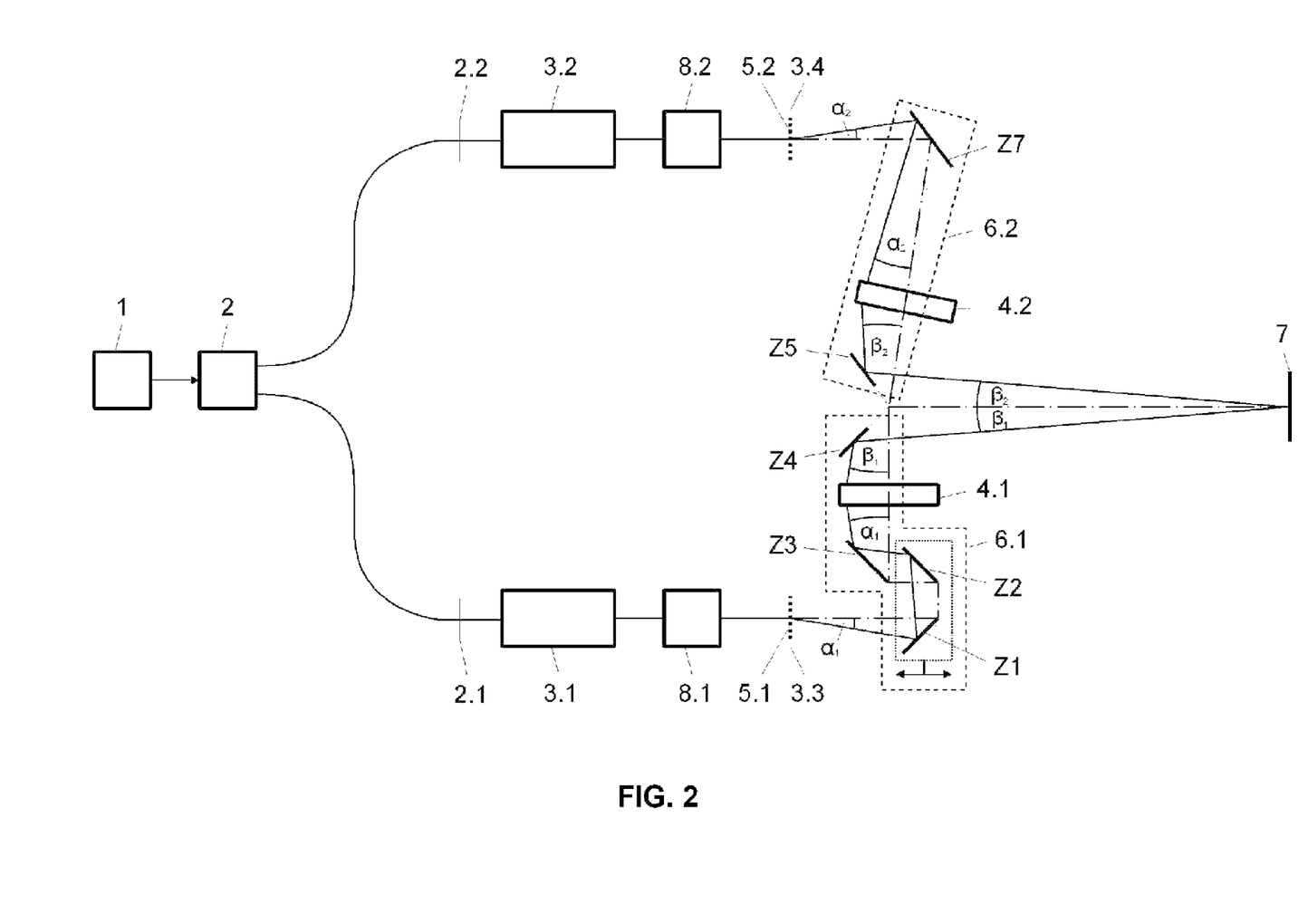
FIG. 2 shows a diagram of an interferometric system with two different transmission type diffraction gratings where one is located in the object branch and the other in the reference branch, and each branch has its own output imaging setup.

The analogy to the given preferred embodiment is the case shown in FIG. 2 where the diffraction gratings are inserted in both branches, it means in both the reference branch and object branch. The arrangement here is therefore such that adjacent to the image plane 3.3 of the first imaging setup 3.1 of the object branch, there is the first diffraction grating 5.1 located and adjacent to the image plane 3.4 of the second imaging setup 3.2 of the reference branch, there is the second diffraction grating 5.2 located. Between the diffraction plane of the first diffraction grating 5.1 and the output imaging setup 4, there is again the first transmission system 6.1 of reflectors inserted and analogically between the diffraction plane of the second diffraction grating 5.2 and the output imaging setup 4, there is the second transmission system 6.2 of reflectors inserted, for which analogical conditions for angles $\alpha 1$, $\beta 1$ and $\alpha 2$, $\beta 2$ apply as in the preceding example. Also in this case it applies that the image plane 3.3 of the first imaging setup 3.1 of the object branch and the output plane 7 of the interferometer and also the image plane 3.4 of the second imaging setup 3.2 of the reference branch and the output plane 7 of the interferometer must be optically conjugated with respect to the output imaging setup 4.

In both the described preferred embodiments, after the first imaging setup 3.1 of the object branch and on its axis, there is the first scanning unit 8.1 located and after the second imaging setup 3.2 of the reference branch and on its axis, there is the second scanning unit 8.2 located, however their implementation is not absolutely necessary.

Diffraction grating 5 can be of reflection or transmission type. One possible embodiment where the diffraction grating 5 is a reflection type diffraction grating is shown in FIG. 1. Here, this reflection type diffraction grating is located in the reference branch and therefore the second transmission system 6.2 of reflectors belongs to it. The second transmission system 6.2 of reflectors is formed at its input by an adjustable semi-transparent flat mirror Z6 located on the axis of the second transmission system 6.2 of reflectors and also on the axis of the second imaging setup 3.2 and in the path of diffracted waves coming from the diffraction grating 5. Further it is formed by an adjustable fifth flat mirror Z5 located in the path of waves reflected by the semi-transparent flat mirror Z6. The reflective surface of the semi-transparent flat mirror Z6 forms a right angle with the reflective surface of the fifth flat mirror Z5. The first transmission system 6.1 of reflectors is then formed at its input by the first flat mirror Z1 located on the axis of the first transmission system 6.1 of reflectors and also on the axis of the first imaging setup 3.1, and further by the second flat mirror Z2 located in the path of waves reflected by the first flat mirror Z1 in such a way that its reflective surface is perpendicular to the reflective surface of the first flat mirror Z1 and parallel with the reflective surface of the third flat mirror Z3 located after it, which has the reflective surface perpendicular to the reflective surface of the fourth flat mirror Z4 located in the path of a reflected beam. The setup of mirrors Z1 and Z2 in the first transmission system 6.1 of reflectors is adjustable in the direction of the axis of the first imaging setup 3.1 of the object branch, which allows the adjustment in the identical optical length of the interferometer branches.

Another possible embodiment where diffraction gratings are inserted in both branches, it means in both the reference branch and the object branch, is shown in FIG. 2. In this case both the diffraction gratings 5.1 and 5.2 are transmission type diffraction gratings. The first and the second transmission system 6.1 and 6.2 of reflectors belongs to the first and the second diffraction grating 5.1 and 5.2 located in the object and the reference branch, respectively. The first transmission system 6.1 of reflectors is formed at its input by the first flat mirror Z1 located on the axis of the first transmission system 6.1 of reflectors and also in the path of the first imaging setup 3.1 and in the path of diffracted waves coming from the first diffraction grating 5.1. Further, it is formed by the second flat mirror Z2 located in the path of the waves coming from the first diffraction grating 5.1 and reflected by the first flat mirror Z1 in such a way that its reflective surface is perpendicular to the reflective surface of the first flat mirror Z1 and parallel with the reflective surface of the third flat mirror Z3 located after it, which has the reflective surface perpendicular to the reflective surface of the fourth flat mirror Z4 located in the path of the reflected beam. The second transmission system 6.2 of reflectors is formed at its input by an adjustable sixth flat mirror Z7 located in the path of the axis of the second transmission system 6.2 of reflectors and also in the path of the second imaging setup 3.2 and in the path of the diffracted waves coming from the second diffraction grating 5.2. Further it is formed by an adjustable fifth flat mirror Z5 located in the path of waves reflected by the sixth flat mirror Z7. The reflective surface of the sixth flat mirror Z7 is parallel with the reflective surface of the fifth flat mirror Z5.

In both embodiments described the setup of the first flat mirror Z1 and the second flat mirror Z2 in the first transmission system 6.1 of reflectors is adjustable in the direction of the axis of the first imaging setup 3.1 of the object branch, which allows the adjustment in the identical optical length of the interferometer branches.

Another possible embodiment is such that in the case when two diffraction gratings are inserted, both are of reflection type or both are of transmission type or one is a reflection type diffraction grating and the other is a transmission type diffraction grating.

Transmission systems of reflectors can technically be realized in many ways, not only those described above.

Diffraction gratings may be located directly in the image planes relevant for them or in the vicinities limited by a distance of ±500 mm from their relevant image planes.

The interferometric system exploits principles of incoherent image holography. The setup is formed by a two-beam grating interferometer with separated object and reference branches, the axes of which coincide in the output plane 7 of the interferometer, they are parallel with the normal line of the output plane 7 and therefore they converge at a zero angle, and actually as a result of implementing diffraction grating 5 or the first diffraction grating 5.1 and the second diffraction grating 5.2, they create an achromatic interference structure with sufficiently high spatial frequency in the output plane 7, it means such a density of fringes that enables reconstruction of the object wave in the whole field of view from a single interferogram or hologram, recorded at a single moment. This significantly limits presence of noise generated by fluctuations of the ambient environment or by vibrations.

The hologram is recorded digitally and the object wave, its amplitude and phase, is reconstructed numerically using algorithms of fast Fourier transform. The information about the amplitude and phase implies information about the object wave in the whole space. Therefore, a single hologram is sufficient for ex post reconstruction of the observed image in planes different from the image plane, it means it allows to re-focus numerically and thus to reconstruct, to a certain extent, spatial distribution of the scanned three-dimensional object. The range, within which such a numerical re-focusing is possible, is given by a degree of coherence of the used waves. Higher degree of coherence allows to re-focus in an axially larger range. Lower degree of coherence narrows such range but it allows to observe objects immersed in strongly scattering media, due to a significantly reduced contribution of multiply scattered waves to the image of a sample, which is valid for both the image intensity and the image phase and this fact has been experimentally verified.

Quadrate of the complex amplitude module obtained by reconstruction of the hologram, it means the intensity image, is depth discriminated, therefore it represents a cross-section through the observed sample. Cross-section thickness depends on the degree of coherence of the used waves and, if light microscopy is considered, it can be narrower than an optical cross-section obtained by confocal microscope. The phase image corresponds to the difference of time of propagation through the object and reference branches caused by the observed sample, it is quantitative and it may be used for measuring the depth of reflective samples with accuracy in orders of thousandths of a wavelength, or, for example, in case of transmitted-light microscopic imaging, it can be used to weigh cells or to analyze the intracellular mass movement.

The frame rate is not limited by any part of the interferometric system. It is limited solely by the speed of the recording device, which is mostly formed by a digital camera and a computer.

With respect to the simultaneous holographic record of the image in many colours at a single moment, it is possible in some cases to overcome destructive interference of light in the sample at a certain wavelength and thus to maintain the phase information from such an observed point.

Embodiment presented as an example in FIG. 1 operates as follows.

An extended, temporally and spatially incoherent source of waves 1, with adjustable degree of both temporal and spatial coherence, which in optical microscopy, for example, can include a regular light bulb, collector lens, ground-glass, aperture diaphragm variable in size (iris diaphragm or a set of removable diaphragms of various diameters), replaceable band-pass filters, replaceable neutral filters to regulate light intensity and IR cut-off filter, which blocks long-wave light, emits waves, which travel to the wave splitter 2, which splits the incoming waves into two mutually coherent beams entering into two branches of the interferometer, most commonly the object branch and the reference branch. In order to maintain the possibility to use completely incoherent waves, both branches of the interferometer are designed to be equivalent. For this reason, in both the object branch and the reference branch, there are identical imaging setups inserted there, specifically the first imaging setup 3.1 and the second imaging setup 3.2, which however can be arbitrary, for example, allowing to image in transmitted-light or in reflected-light, and for microscopic or macroscopic imaging.

The waves from the wave splitter 2 entering into the object branch impact the observed object located in the first object plane 2.1 of the first imaging setup 3.1 of the object branch and then pass through the first imaging setup 3.1, the first scanning unit 8.1 and the first transmission system 6.1 of reflectors in such a way that they are reflected by the first flat mirror Z1 to the image plane 3.3 of the first imaging setup 3.1 of the object branch where there an image of the object inserted in the first object plane 2.1 is created. The waves then impact the second flat mirror Z2 where they are again reflected and impact the third flat mirror Z3 where they are further reflected and impact the fourth flat mirror Z4 where they are reflected and enter into the output imaging setup 4, via which they pass to the output plane 7 of the interferometer where there the second image of the object inserted in the first object plane 2.1 is created.

The waves from the wave splitter 2 entering into the reference branch impact the reference object located in the second object plane 2.2 of the second imaging setup 3.2 of the reference branch and then pass through the second imaging setup 3.2, the second scanning unit 8.2 and the second transmission system 6.2 of reflectors in such a way that they pass through a semi-transparent flat mirror Z6 and impact the diffraction plane of a reflection type diffraction grating 5 located in the image plane 3.4 of the second imaging setup 3.2 where there an image of the reference object inserted in the second object plane 2.2 is created. The beam of waves travelling on the axis of the reference branch and diffracted by the diffraction grating 5 at an angle $\alpha$ impacts again the semi-transparent flat mirror Z6 where it is reflected and impacts the fifth flat mirror Z5 where it is reflected and enters into the output imaging setup 4 also at the angle $\alpha$ with respect to the axis of this output imaging setup 4, it passes through it and comes out from this output imaging setup 4 with respect to its axis at an angle $\beta$ a and enters into the output plane 7 of the interferometer with respect to its normal line also at the angle $\beta$ where there the second image of the reference object inserted in the second object plane 2.2 is created. The relation between angles $\beta$ and $\alpha$ is $\sin(\beta)=\sin(\alpha)/m$ where m is a magnification of the output imaging setup 4.

Waves from the object branch and the reference branch interfere in the output plane 7 of the interferometer and create an interference structure of fringes with spatial frequency equal to the spatial frequency of the diffraction grating 5 divided by a magnification of the output imaging setup 4.

Once a broadband source of waves is used, a dependence of diffraction angle on a wavelength appears there, so-called angular dispersion, due to the presence of diffraction grating 5. Angle $\alpha$ and subsequently also angle $\beta$ are different for different wavelengths. Using a proper spatial frequency, a proper position of the diffraction grating 5 and a suitable proper tilt of the mirrors in both the first transmission system 6.1 and the second transmission system 6.2 of reflectors allows the achievement of waves with different wavelengths to enter into the output plane 7 at different angles such that the created interference structure has equal and sufficiently high spatial frequency for each wavelength, it means such a density of fringes that will allow to reconstruct the object wave in the whole field of view from a single interferogram, i.e. hologram.

In the output plane 7 of the interferometer, there is a detector located, which is usually a digital camera connected to a computer. Magnification m of the output imaging setup 4 is such that the attached detector is able to perform sufficient sampling of the interference structure present in the output plane 7 of the interferometer with respect to the maximum spatial frequency present in the hologram at the output plane 7 of the interferometer.

The setup of the first flat mirror Z1 and the second flat mirror Z2 in the first transmission system 6.1 of reflectors is adjustable in the direction of the axis of the first imaging setup 3.1 of the object branch, which allows the adjustment in the identical time of propagation of waves through both of the branches of the interferometer.

The first scanning unit 8.1 and the second scanning unit 8.2 ensure coincidence of axes of the object branch and the reference branch in the output plane 7 of the interferometer. They are also used to determine the function of mutual coherence, especially in the case of observation through a scattering media, when it is possible, by tilting the beam of rays coming into the output plane 7 of the interferometer from the object branch, to obtain a non-shifted image of an observed object, created with the contribution of a non-ballistic light scattered at a point of observation at an angle greater than the aperture angle of the objective lens.

The observed object and the reference object can also be inserted in any suitable plane in the relevant branch conjugated by the relevant imaging setup or its part with relevant object planes 2.1 and 2.2.

The interferometric system operates in a similar manner also in other described preferred embodiments.

Industrial Applicability

The proposed interferometric system can be used, for example, in combination with common microscope imaging setups, which image both in reflected and transmitted-light, it can also be used for macroscopic holographic recording. It is suitable for in vitro observation of living cells, possibly immersed in suspension, and their reactions to external stimuli, or for measuring the surfaces of reflective samples covered by scattering media.

The invention claimed is:

1. An interferometer with a spatial carrier frequency and capable of imaging in polychromatic radiation, comprising:
   temporally and spatially incoherent source of waves, after which a wave splitter is inserted which splits incoming waves into two separated branches of the interferometer, specifically into a first branch and into a second branch;
   a first imaging setup being provided on the axis of the first branch, an image plane of the first imaging setup being with respect to the first imaging setup an image of a first object plane of the first imaging setup;
   a second imaging setup being provided on the axis of the second branch, an image plane of the second imaging setup being with respect to the second imaging setup an image of a second object plane of the second imaging setup, said second imaging setup being identical with said first imaging setup with respect to both time of propagation of waves and magnification;
   a detector located in an output plane of the interferometer, a difference of time of propagation of the waves in the first branch and the second branch being smaller than a coherence time of the waves measured from a beam splitting point at the wave splitter up to the output plane of the interferometer;
   a first output imaging setup being located after an image plane of the first imaging setup and before the output plane of the interferometer, the output plane of the interferometer being with respect to the first output imaging setup an image of the image plane of the first imaging setup;
   a second output imaging setup being located after an image plane of the second imaging setup and before the output plane of the interferometer, the output plane of the interferometer being with respect to the second output imaging setup an image of the image plane of the second imaging setup, and a total magnification between the first object plane of the first imaging setup of the first branch and the output plane of the interferometer being equal to the total magnification between the second object plane of the second imaging setup of the second branch and the output plane of the interferometer;
   a transmission system of reflectors being provided in at least one of the said branches and being arranged so that the axis of the first branch and the axis of the second branch coincide before an entrance to the output plane of the interferometer and the axis of the first branch and the axis of the second branch are parallel with a normal line of the output plane of the interferometer; and,
   a diffraction grating provided in a vicinity of the image plane of the second imaging setup of the second branch, so that a beam of waves travelling on the axis of the second branch is diffracted by the diffraction grating at an angle ($\alpha$) and enters into the second output imaging setup at the angle ($\alpha$) with respect to the axis of the second output imaging setup and exits from this second imaging setup at an angle ($\beta$) with respect to the axis of the second branch and enters into the output plane of the interferometer with respect to its normal line also at the angle ($\beta$), and the relation between angles ($\beta$) and ($\alpha$) is $\sin(\beta) = \sin(\alpha)/m$ where m is a magnification of the second output imaging setup;
   wherein the beam of waves which travels on the axis of the first imaging setup of the first branch enters into the first output imaging setup on its axis and exits from it also on its axis and enters into the output plane of the interferometer in the direction of its normal line.

2. The interferometer of claim 1 wherein:
   the first branch is an object branch,
   the second branch is a reference branch,
   the diffraction grating is a reflection type diffraction grating,
   a second transmission system of reflectors is provided in the second branch and is formed at its input by an adjustable semi-transparent flat mirror located on the axis of the second transmission system of reflectors and also on the axis of the second imaging setup and in the path of diffracted waves coming from the diffraction grating, and by an adjustable fifth flat mirror located in the path of waves reflected by the semi-transparent flat mirror, a reflective surface of the semi-transparent flat mirror forming a right angle with a reflective surface of the fifth flat mirror,
   a first transmission system of reflectors is provided in the first branch and is formed at its input by a first flat mirror located on the axis of the first transmission system of reflectors and also on the axis of the first imaging setup, and by a second flat mirror located in the path of waves reflected by the first flat mirror in such a way that its reflective surface is perpendicular to the reflective surface of the first flat mirror and parallel with the reflective surface of a third flat mirror located after it, which has the reflective surface perpendicular to the reflective surface of a fourth flat mirror located in the path of a reflected beam.

3. The interferometer of claim 2 wherein any of the diffraction gratings is located in an image plane of its relevant imaging setup.

4. The interferometer of claim 2 wherein any of the diffraction gratings is located in a vicinity limited by a distance of ±500 mm from an image plane of its relevant imaging setup.

5. The interferometer of claim 1 wherein any of the diffraction gratings is located in an image plane of its relevant imaging setup.

6. The interferometer of claim 1 wherein any of the diffraction gratings is located in a vicinity limited by a distance of ±500 mm from an image plane of its relevant imaging setup.

7. An interferometer with a spatial carrier frequency and capable of imaging in polychromatic radiation, comprising:

temporally and spatially incoherent source of waves, after which a wave splitter is inserted which splits incoming waves into two separated branches of the interferometer, specifically into a first branch and into a second branch;

a first imaging setup being provided on the axis of the first branch, an image plane of the first imaging setup being with respect to the first imaging setup an image of a first object plane of the first imaging setup;

a second imaging setup being provided on the axis of the second branch, an image plane of the second imaging setup being with respect to the second imaging setup an image of a second object plane of the second imaging setup, said second imaging setup being identical with said first imaging setup with respect to both time of propagation of waves and magnification;

a detector located in an output plane of the interferometer, a difference of time of propagation of the waves in the first branch and the second branch being smaller than a coherence time of the waves measured from a beam splitting point at the wave splitter up to the output plane of the interferometer;

a first output imaging setup being located after an image plane of the first imaging setup and before the output plane of the interferometer, the output plane of the interferometer being with respect to the first output imaging setup an image of the image plane of the first imaging setup;

a second output imaging setup being located after an image plane of the second imaging setup and before the output plane of the interferometer, the output plane of the interferometer being with respect to the second output imaging setup an image of the image plane of the second imaging setup, and a total magnification between the first object plane of the first imaging setup of the first branch and the output plane of the interferometer being equal to the total magnification between the second object plane of the second imaging setup of the second branch and the output plane of the interferometer;

a transmission system of reflectors being provided in at least one of the said branches and being arranged so that the axis of the first branch and the axis of the second branch coincide before an entrance to the output plane of the interferometer and the axis of the first branch and the axis of the second branch are parallel with a normal line of the output plane of the interferometer;

a first diffraction grating provided in a vicinity of the image plane of the first imaging setup of the first branch, so that a beam of waves travelling on the axis of the first branch is diffracted by the first diffraction grating at an angle $(\alpha_1)$ and enters into the first output imaging setup at the angle $(\alpha_1)$ with respect to the axis of the first output imaging setup and exits from this first imaging setup at an angle $(\beta_1)$ with respect to the axis of the first branch and enters into the output plane of the interferometer with respect to its normal line also at the angle $(\beta_1)$, and the relation between angles $(\beta_1)$ and $(\alpha_1)$ is $\sin(\beta_1) = \sin(\alpha_1)/m_1$ where m is a magnification of the first output imaging setup; and, a second diffraction grating provided in a vicinity of the image plane of the second imaging setup of the second branch, so that a beam of waves travelling on the axis of the second branch is diffracted by the second diffraction grating at an angle $(\alpha_2)$ and enters into the second output imaging setup at the angle $(\alpha_2)$ with respect to the axis of the second output imaging setup and exits from this second imaging setup at an angle $(\beta_2)$ with respect to the axis of the second branch and enters into the output plane of the interferometer with respect to its normal line also at the angle $(\beta_2)$, and the relation between angles $(\beta_2)$ and $(\alpha_2)$ is $\sin(\beta_2) = \sin(\alpha_2)/m_2$ where $m_2$ is a magnification of the second output imaging setup.

8. The interferometer of claim 7 wherein:

the first branch is an object branch, the second branch is a reference branch, the first diffraction grating is a transmission type diffraction grating, the second diffraction grating is a transmission type diffraction grating, a second transmission system of reflectors is provided in the second branch and is formed at its input by an adjustable sixth flat mirror located on the axis of the second transmission system of reflectors and also on the axis of the second imaging setup and in the path of diffracted waves coming from the second diffraction grating, and further by an adjustable fifth flat mirror located in the path of waves reflected by a sixth flat mirror, the surface of the fifth flat mirror being parallel with the reflective surface of the sixth flat mirror, a first transmission system of reflectors is provided in the first branch and is formed at its input by a first flat mirror located on the axis of the first transmission system of reflectors and also on the axis of the first imaging setup and in the path of diffracted waves coming from the first diffraction grating, and further by a second flat mirror located in the path of waves reflected by the first flat mirror in such a way that its reflective surface is perpendicular to the reflective surface of the first flat mirror and parallel with the reflective surface of a third flat mirror located after it, which has the reflective surface perpendicular to the reflective surface of a fourth flat mirror located in the path of a reflected beam.

9. The interferometer of claim 8 wherein any of the diffraction gratings is located in an image plane of its relevant imaging setup.

10. The interferometer of claim 8 wherein any of the diffraction gratings is located in a vicinity limited by a distance of ±500 mm from an image plane of its relevant imaging setup.

11. The interferometer of claim 7 wherein the first diffraction grating is a reflection type diffraction grating or a transmission type diffraction grating and also the second diffraction grating is a reflection type diffraction grating or a transmission type diffraction grating.

12. The interferometer of claim 11 wherein any of the diffraction gratings is located in an image plane of its relevant imaging setup.

13. The interferometer of claim 11 wherein any of the diffraction gratings is located in a vicinity limited by a distance of ±500 mm from an image plane of its relevant imaging setup.

14. The interferometer of claim 7 wherein any of the diffraction gratings is located in an image plane of its relevant imaging setup.

15. The interferometer of claim 7 wherein any of the diffraction gratings is located in a vicinity limited by a distance of ±500 mm from an image plane of its relevant imaging setup.

16. The interferometer of any claims 1 to 13 wherein the first output imaging setup and the second output imaging setup are formed by a single common output imaging setup located on the common axis of the first and second branch between the image planes of the imaging setups and the output plane of the interferometer.

17. The interferometer of any claims 1 to 13 wherein after the first imaging setup of the first branch on the axis of the first branch is located a first scanning unit and after the second imaging setup of the second branch on the axis of the second branch is located a second scanning unit.

18. The interferometer of any claims 1 to 13 wherein the first output imaging setup and the second output imaging setup are formed by a single common output imaging setup located on the common axis of the first and second branch between the image planes of the imaging setups and the output plane of the interferometer and wherein after the first imaging setup of the first branch on the axis of the first branch is located a first scanning unit and after the second imaging setup of the second branch on the axis of the second branch is located a second scanning unit.

* * * * *